(12) United States Patent
Wang et al.

(10) Patent No.: US 12,141,037 B2
(45) Date of Patent: Nov. 12, 2024

(54) METHOD AND ELECTRONIC DEVICE FOR RECOVERING DATA USING ADAPTIVE RANK-ONE MATRIX COMPLETION

(71) Applicant: City University of Hong Kong, Hong Kong (HK)

(72) Inventors: Zhiyong Wang, Hong Kong (HK); Xiaopeng Li, Shenzhen (CN); Hing Cheung So, Hong Kong (HK); Abdelhak M. Zoubir, Darmstadt (DE)

(73) Assignee: City University of Hong Kong, Hong Kong (HK)

( * ) Notice: Subject to any disclaimer, the term of this patent is extended or adjusted under 35 U.S.C. 154(b) by 389 days.

(21) Appl. No.: 17/560,201

(22) Filed: Dec. 22, 2021

(65) Prior Publication Data
US 2023/0205644 A1    Jun. 29, 2023

(51) Int. Cl.
*G06F 11/14* (2006.01)
*G06F 17/16* (2006.01)

(52) U.S. Cl.
CPC ......... *G06F 11/1469* (2013.01); *G06F 17/16* (2013.01); *G06F 2201/805* (2013.01)

(58) Field of Classification Search
CPC . G06F 11/1469; G06F 17/16; G06F 2201/805
See application file for complete search history.

(56) References Cited

U.S. PATENT DOCUMENTS

| | | | | |
|---|---|---|---|---|
| 10,879,681 | B2 * | 12/2020 | Shemtov | H02G 3/0683 |
| 11,521,304 | B1 * | 12/2022 | Navasardyan | G06T 5/77 |
| 12,014,504 | B2 * | 6/2024 | Cao | H04N 23/84 |
| 2017/0367590 | A1 * | 12/2017 | Sebe | G06T 7/11 |

OTHER PUBLICATIONS

Shi et al. (Rank-One Matrix Completion With Automatic Rank Estimation via L1-Norm Regularization, IEEE, 2018). (Year: 2018).*
Sharma et al. (Adaptive matrix completion for the users and the items in tail, 2019). (Year: 2019).*
(Continued)

*Primary Examiner* — Mohammad K Islam
(74) *Attorney, Agent, or Firm* — IDEA Intellectual Limited; Margaret A. Burke; Sam T. Yip

(57) ABSTRACT

A method for performing data recovering operation is provided. The method includes: identifying a plurality of first values and a plurality of first indexes of a plurality of first entries of an incomplete matrix in a received object data, and one or more second values and one or more second indexes of one or more second entries of the incomplete matrix; inputting the first values, the first indexes, a preset first parameter, a preset second parameter and a preset third parameter into an analysis model using Adaptive Rank-One Matrix Completion (AROMC) algorithm; and obtaining a recovered complete matrix corresponding to the incomplete matrix from the analysis model, so as to obtain optimized one or more second values of the second entries, wherein the optimized one or more second values are determined as original values of the second entries, such that the incomplete matrix is recovered to the recovered complete matrix.

14 Claims, 7 Drawing Sheets

(56) References Cited

OTHER PUBLICATIONS

Gao et al. (A Riemannian rank-adaptive method for low-rank matrix completion, 2021) (Year: 2021).*

J.-F. Cai, E. J. Candes, and Z. Shen, "A singular value thresholding algorithm for matrix completion" SIAM Journal on Optimization, vol. 20, No. 4, pp. 1956-1982, Mar. 2010.

S. Ma, D. Goldfarb, and L. Chen, "Fixed point and Bregman iterative methods for matrix rank minimization" Mathematical Programming, vol. 128, No. 1, pp. 321-353, Jun. 2011.

P. Jain, R. Meka and I. S. Dhillon, "Guaranteed rank minimization via singular value projection" Advances in Neural Information Processing Systems, pp. 937-945, 2010.

X. Jiang, Z. Zhong, X. Liu, and H. C. So, "Robust matrix completion via alternating projection" IEEE Signal Processing Letters, vol. 24, No. 5, pp. 579-583, May 2017.

Z. Wen, W. Yin, and Y. Zhang, "Solving a low-rank factorization model for matrix completion by a nonlinear successive over-relaxation algorithm" Mathematical Programming Computation, vol. 4, No. 4, pp. 333-361, Dec. 2012.

Q. Li, Z. Zhu, and G. Tang, "Alternating minimizations converge to second-order optimal solutions" in Processing of the 36th International Conference Machine Learning, California, USA, Jun. 2019, pp. 3935-3943.

Z. Wang, M.-J. Lai, Z. Lu, W. Fan, H. Davulcu, and J. Ye, "Orthogonal rank-one matrix pursuit for low-rank matrix completion" SIAM Journal on Scientific Computing, vol. 37, No. 1, pp. A488-A514, 2015.

Q. Shi, H. Lu, and Y.-M. Cheung, "Rank-one matrix completion with automatic rank estimation via L1-norm regularization" IEEE Transactions on Neural Networks and Learning Systems, vol. 29, No. 10, pp. 4744-4757, Oct. 2018.

C. Eckart and G. Young, "The approximation of one matrix by another of lower rank" Psychometrika, vol. 1, No. 3, pp. 211-218, Sep. 1936.

Z. Zhu, Q. Li, G. Tang, and M. B. Wakin, "Global optimality in low-rank matrix optimization" IEEE Transactions on Signal Processing, vol. 66, No. 13, pp. 3614-3628, Jul. 2018.

Z. Zhu, Q. Li, G. Tang, and M. B. Wakin, "The global optimization geometry of low-rank matrix optimization," IEEE Transactions on Information Theory, vol. 67, No. 2, pp. 1308-1331, Feb. 2021.

* cited by examiner

METHOD AND ELECTRONIC DEVICE FOR RECOVERING DATA USING ADAPTIVE RANK-ONE MATRIX COMPLETION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to data recovery, and in particular, to a method and electronic device for performing data recovering operation on an incomplete matrix by an analysis model using Adaptive Rank-One Matrix Completion (AROMC) algorithm.

BACKGROUND OF THE INVENTION

Matrix completion refers to the recovery of a low-rank matrix from a small subset of its entries, and is an important topic because numerous real-world data, such as multiple-input multiple-output (MIMO) radar signals and images, can be modeled as a low-rank matrix for better processing and analysis in various applications. One popular approach for matrix completion is based on low-rank matrix factorization, but it requires knowing the matrix rank, which is difficult to accurately determine in many practical scenarios.

Therefore, there is a need for performing matrix completion without knowing the rank information, so to improve the efficiency of matrix completion in applications, such as image inpainting, hyperspectral remote sensing, and multi-task learning.

SUMMARY OF THE INVENTION

An AROMC algorithm can be used for performing a matrix completion without knowing the rank information. It is based on rank-one approximation that a matrix can be decomposed as a sum of outer products. The key idea is to seek the hidden low-dimensional vector subspace that captures most of the information in the incomplete target matrix and then project the matrix orthogonally into that subspace to obtain the optimal weight representation, so as to obtain a recovered complete matrix most fitting the observed entries (the entries not the missing entries of the incomplete matrix). In contrast to the conventional rank-one schemes that basically employ unchanging rank-one basis matrices, the provided AROMC algorithm performs a matrix completion from the vector viewpoint and is able to generate continuously updated rank-one basis matrices via alternating minimization according to the outer product representation.

In accordance to one aspect of the present invention, a computer-implemented method for performing data recovering operation implemented by an electronic device is provided. The method includes: receiving, by a processor of the electronic device, object data from a data source; receiving, by a processor of the electronic device, object data, wherein the object data comprises an incomplete matrix; identifying, by the processor, a plurality of first values and a plurality of first indexes of a plurality of first entries of the incomplete matrix, and one or more second values and one or more second indexes of one or more second entries of the incomplete matrix according to the object data, wherein the first values of the first entries are determined as original values of the first entries, and the one or more second values of the second entries are determined as non-original values of the second entries; inputting, by the processor, the first values, the first indexes, the second indexes, a preset first parameter, a preset second parameter and a preset third parameter into an executed analysis model using Adaptive Rank-One Matrix Completion (AROMC) algorithm, wherein the first parameter is a maximum total number of one or more outer optimization iterations performed by the analysis model, the second parameter is a tolerance coefficient, and the third parameter is a convergence coefficient; and obtaining, by the processor, a recovered complete matrix corresponding to the incomplete matrix from the analysis model, so as to obtain optimized one or more second values of the second entries, wherein the optimized one or more second values are determined as original values of the second entries, such that missing data corresponding to the second entries of the incomplete matrix is recovered by the recovered complete matrix.

In accordance to another aspect of the present invention, an electronic device is provided, and the electronic device comprises a processor configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, a method and an electronic device configured to execute the same for performing data recovery by using AROMC algorithm and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
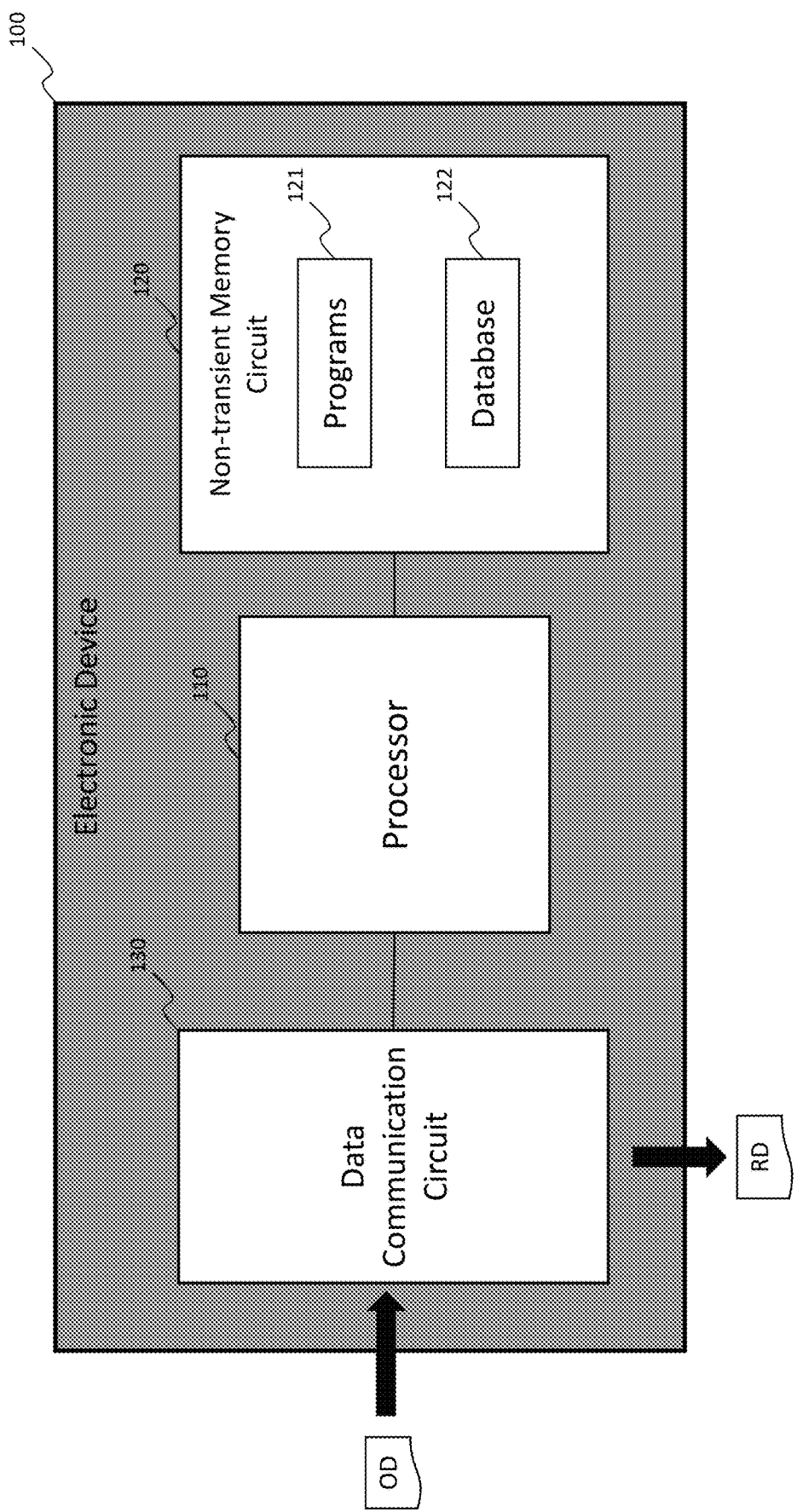
FIG. 1 depicts a block diagram illustrating an electronic device a in accordance with one embodiment of the present invention.

Referring to FIG. 1 in the following description. In accordance with various embodiments of the present invention, provided is an electronic device 100 that includes a processor 110, a non-transient memory circuit 120 and a data communication circuit 130.

The non-transient memory circuit 120 is configured to store machine instructions 121 and to host the database 122. The database 122 may be used to store object data OD, and/or result data RD. The data communication circuit 130 is configured to establish the network connection(s) for receiving the object data OD, and the network connection(s) can be wired or wireless data communication connection(s). Furthermore, the data communication circuit 130 is configured to establish a further network connection for sending the result data RD. The processor 110 executes the machine instructions 121 to implement methods provided by the presented disclosure.

The object data include an incomplete matrix, and the dimensions of the incomplete matrix is m×n. Some of data (entries) in a matrix, by interruption of any kind, are lost (e.g., missing entries) or are determined as not having the original values, as such the matrix is called as an "incomplete matrix". A complete matrix means that all entries in the matrix are determined as authentic (or not missing) or are determined as having the original values.

Figure 2:
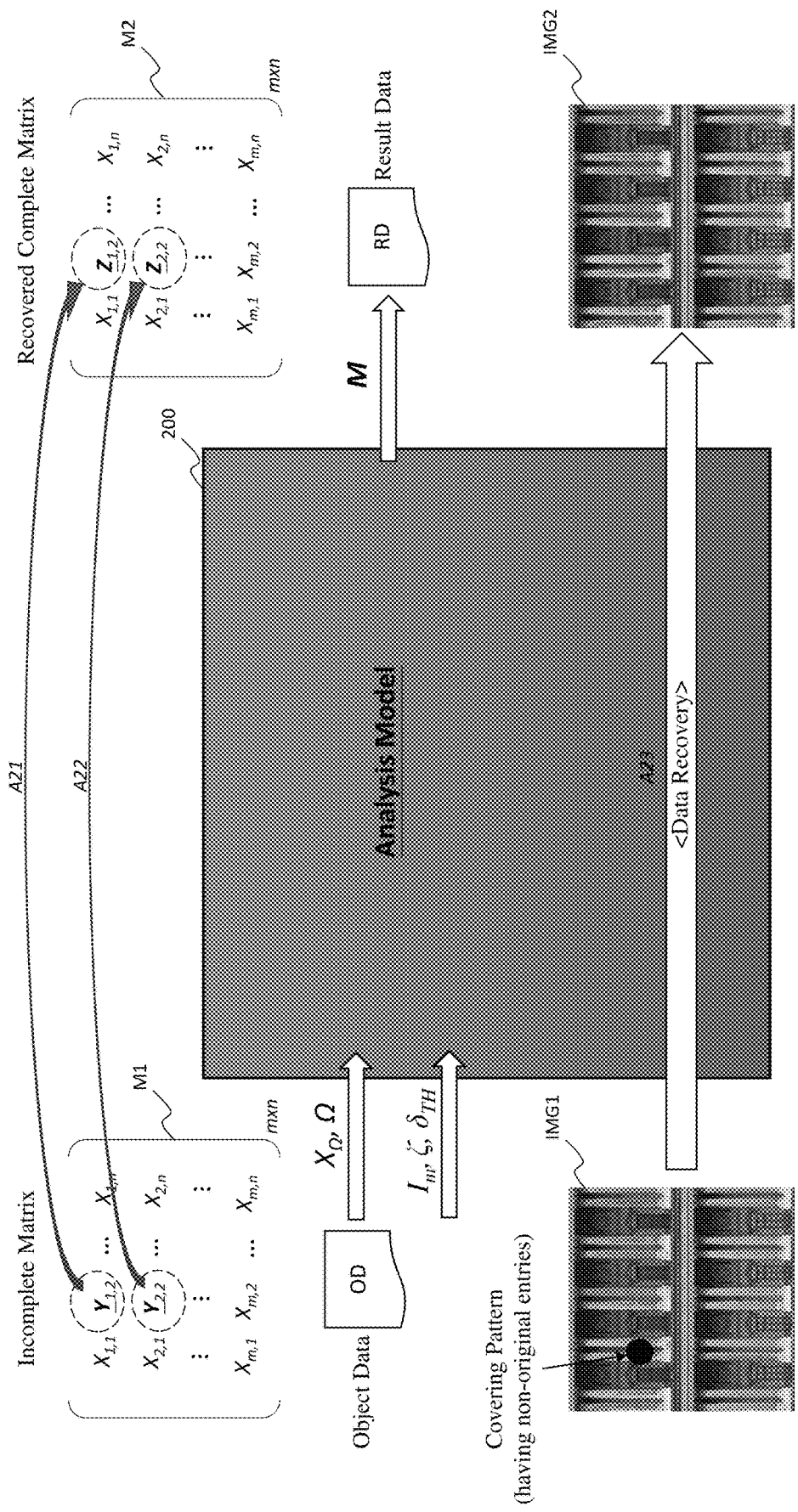
FIG. 2 depicts a schematic diagram illustrating data recovery operation performed by the analysis model.

Referring to FIG. 2 in the following description. The incomplete matrix M1 has observed entries (labeled by "X") and missing entries (labeled by "Y"). The value of each observed entries (e.g., first entries) is known or determined as authentic (being the original value of the desired complete matrix). The value of each missing entries (e.g., second entries) is unknown or determined as not-authentic.

In accordance to one embodiment, the processor 110 executes the analysis model 200 for performing data recovery by analyzing the input data using the AROMC algorithm. The input data includes the values ($X_\Omega$) and positions/indexes ($\Omega$) of the observed entries (first entries) of the incomplete matrix identified from the object data OD, a first parameter ($I_m$), a second parameter ($\zeta$) and a third parameter ($\delta_{TH}$). The first parameter ($I_m$) is a maximum total number of one or more outer optimization iterations performed by the analysis model, the second parameter ($\zeta$) is a tolerance coefficient, and the third parameter ($\delta_{TH}$) is a convergence coefficient.

The analysis model 200 generates a recovered complete matrix M according to the input data by using the AROMC algorithm provided by present disclosure. For example, as illustrated by arrow A21 and A22, the values of missing entries $Y_{1,2}$ and $Y_{2,2}$ of the incomplete matrix M1 is recovered, such that the missing entries $Y_{1,2}$ and $Y_{2,2}$ are recovered as entries $Z_{1,2}$ and $Z_{2,2}$, and the incomplete matrix M1 is transformed to the recovered complete matrix M2. Then, the processor 110 generates the result data RD having the recovered complete matrix M. The generated result data RD may have auxiliary information related to the object data RD.

For example, for image inpainting, assuming that the interrupted/damaged image IMG1 is received by the processor 110 as the object data OD, wherein a covering pattern is on the image IMG1, the processor 110 determines that the color information of pixels (e.g., missing entries) of the image IMG1 under the covering pattern is missing. The entries other than the missing entries are determined as observed entries, and the values ($X_\Omega$) and positions ($\Omega$) of the observed entries are confirmed by the processor 110. Then, the values ($X_\Omega$) and positions ($\Omega$) of the observed entries of the image IMG1 is inputted with the first to third parameters into the analysis model to recover the image IMG1 to the image IMG2. As illustrated by arrow A23, the color information (values of pixels) corresponding the missing entries of the image IMG1 is recovered as shown by the image IMG2 in the FIG. 2.

Figure 3:
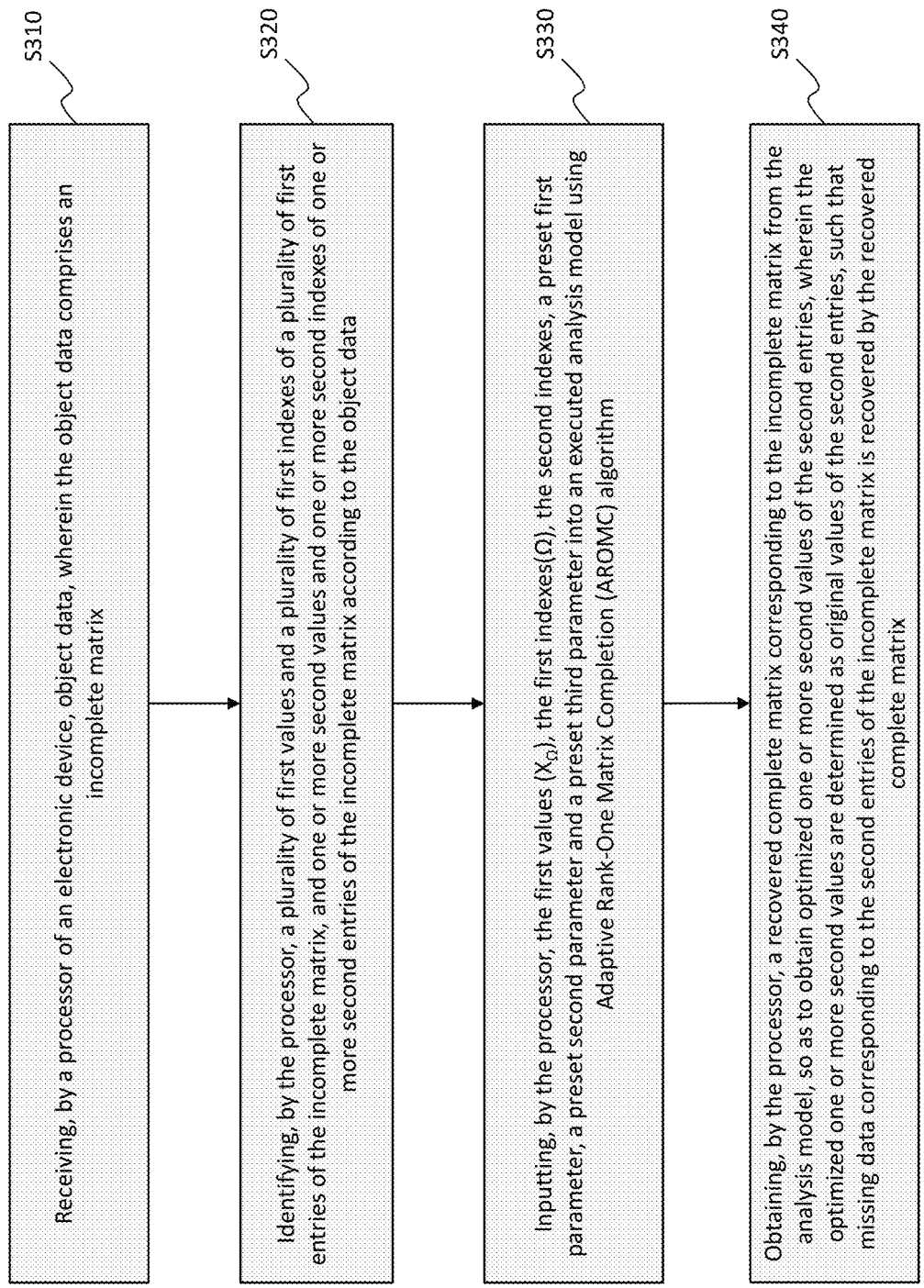
FIG. 3 depicts a flowchart of a data recovery method using AROMC algorithm implemented by the electronic device.

Referring to FIG. 3 in the following description. In step S310, the processor 110 receives one or more object data, wherein the object data comprise at least an incomplete matrix. Next, in step S320, the processor 110 identifies a plurality of first values and a plurality of first indexes of a plurality of first entries of the incomplete matrix, and one or more second values and one or more second indexes of one or more second entries of the incomplete matrix according to the object data. Next, the processor 110 inputs the first values ($X_\Omega$), the first indexes ($\Omega$), the second indexes, a preset first parameter, a preset second parameter and a preset third parameter into an executed analysis model using Adaptive Rank-One Matrix Completion (AROMC) algorithm. Next, the processor 110 computes a recovered complete matrix from the incomplete matrix via the execution of the analysis model 200. The recovered complete matrix is then used to recover the missing data corresponding to the second entries of the incomplete matrix to obtain one or more optimized second values of the second entries, wherein the optimized second values are determined to be the original values of the second entries.

The details of the AROMC algorithm are set forth below with reference to FIG. 4 to FIG. 7.

In each iteration of AROMC, one basis vector is added to increment the dimension of vector subspace and the resulting vector subspace is perpendicular to the space spanned by the columns of residual matrix, which results in a better recovery performance because all information associated with the basis vectors are orthogonally projected into the vector subspace in the column vectors of residual matrix. In addition, only O(log(1/ϵ)) iterations are required to obtain an ϵ-accuracy solution.

To obtain a more flexible rank-one basis matrix representation, expressing X as a sum of r outer products according to equation (1) below. One outer product means a column vector times a row vector, and hence r outer products mean a matrix that contains r column vectors times a matrix that contains r row vectors. In the image recovery case, it means that the image can be approximately fit via using the product of two rank-r matrices.

$$X = UV^T = u_1 v_1^T + u_2 v_2^T + \ldots + u_r v_r^T \qquad (1)$$

where $U=[u_1, u_2, \ldots, u_r]$, $V=[v_1, v_2, \ldots, v_r]$, and the column vectors in U or V are not required to be orthogonal. It is worth noting that equation (1) is different from the conventional singular value decomposition (SVD) calculation in which basis vectors are orthonormal. Furthermore, $u_1, u_2, \ldots, u_r$, are considered as basis vectors to be determined while $v_1, v_2, \ldots, v_r$, are the corresponding weight vectors.

The matrix completion problem of AROMC can be formulated according to the equation (2) below.

$$\min_{u_p, \{v_i\}} \left\| X - \sum_{i=1}^{p-1} \bar{u}_i v_i^T - u_p v_p^T \right\|_\Omega^2 \qquad (2)$$

where p represents the $p^{th}$ outer iteration (also known as outer optimization iteration), $\bar{u}_1, \bar{u}_2, \ldots, \bar{u}_{p-1}$, are the basis vectors fixed in the subsequent outer iterations, and $u_p$ and $v_1, v_2, \ldots, v_p$ are the $p^{th}$ basis vector and weight vectors respectively to be updated. Hence, there are (p+1) unknown vectors, i.e., $u_p, v_1, v_2, \ldots, v_p$. As the weight vectors being updated at each iteration, the previously computed rank-one basis matrices are continuously refined. For example, when compared with the result at the $(p-1)^{th}$ iteration that attains a rank-(p-1) matrix, the $p^{th}$ outer iteration produces a rank-p matrix, and the relationship between them (i.e., the rank-(p-1) matrix and the rank-p matrix) is that they have (p-1)

identical basis vectors, $\bar{u}_1, \bar{u}_2, \ldots, \bar{u}_{p-1}$. Apparently, the rank of the obtained matrix increases as the number of basis vectors increases.

In one embodiment, an alternating minimization is adopted for solving problem of equation (2), of which goal is to optimize one of the factors in (2) while fixing the other in an alternate manner. Specifically, in the $k^{th}$ (k=1, 2, . . . ) inner iteration, $V^k$ and $u_p^k$ are alternately minimized according to equation (3) and equation (4) below, respectively.

$$V^k = \arg\min_V \|X - U^{k-1} V^T\|_\Omega^2 \qquad (3)$$

$$u_p^k = \arg\min_{u_p} \|X - [\bar{U}_{p-1}, u_p](V^k)^T\|_\Omega^2 \qquad (4)$$

where $\bar{U}_{p-1} = [\bar{u}_1, \bar{u}_2, \ldots, \bar{u}_{p-1}]$, $U^{k-1} = [\bar{U}_{p-1}, u_p^{k-1}]$ and $V^k = [v_1^k, v_2^k, \ldots, v_p^k]$.

Equation (3) can be formulated for a fixed $U^{k-1}$ according to a problem equation (5) below.

$$\min_V f(V) := \|X - UV^T\|_\Omega^2 \qquad (5)$$

where the superscript $(\cdot)^k$ is dropped for notational simplicity. The problem (5) is equivalent to addressing the following n independent subproblems according to equation (6) below because f(V) can be decoupled with respect to (w.r.t.) $V_{j,:}$ for j=1, 2, . . . , n.

$$\min_{V_{j,:}} f(V_{j,:}) := \|X_{:,j} - UV_{j,:}^T\|_\Omega^2 \qquad (6)$$

where $V_{j,:}$ represents the $j^{th}$ row of V. For any matrix A, $A_{j,:}$ (resp. $A_{:,j}$) is denoted as its jth row (resp. column). The row indices of the observed values (i.e., values of first entries) in the $j^{th}$ column of X, which are contained in $\mathcal{I}_j$, and hence the total index set $\mathcal{I}$ for X is $\mathcal{I} = \{\mathcal{I}_1, \mathcal{I}_2, \ldots, \mathcal{I}_n\}$.

Apparently, $$\sum_{j=1}^n |\mathcal{I}_j| = |\Omega|,$$

where $|\mathcal{I}|$ stands for the cardinality of the set $\mathcal{I}$. Defining $U_{\mathcal{I}_j} \in \mathbb{R}^{|\mathcal{I}_j| \times p}$ which contains the $|\mathcal{I}_j|$ rows indexed by $\mathcal{I}_j$ according to equation (7) below.

$$U_{\mathcal{I}_j} = \begin{bmatrix} U_{\mathcal{I}_{j_1},:} \\ U_{\mathcal{I}_{j_2},:} \\ \vdots \\ U_{\mathcal{I}_{j_{|\mathcal{I}_j|}},:} \end{bmatrix} \qquad (7)$$

where $\mathcal{I}_{j_i}$ represents the $i^{th}$ element of $\mathcal{I}_j$, and the associated vector $$(X_{:,j})_{\mathcal{I}_j} = \begin{bmatrix} X_{\mathcal{I}_{j_1},j}, \ldots, X_{\mathcal{I}_{j_{|\mathcal{I}_j|}},j} \end{bmatrix}^T,$$

and equation (6) can then be rewritten as, equation (8) below:

$$\min_{V_{j,:}} f(V_{j,:}) := \|(X_{:,j})_{\mathcal{I}_j} - U_{\mathcal{I}_j} V_{j,:}^T\|^2 \qquad (8)$$

and, the solution of equation (8) can simply be the linear least squares (LS) estimate as equation (9) below:

$$V_{j,:}^T = (U_{\mathcal{I}_j}^T U_{\mathcal{I}_j})^{-1} U_{\mathcal{I}_j}^T (X_{:,j})_{\mathcal{I}_j} \qquad (9)$$

The computational complexity is $\mathcal{O}(|\Omega| p^2)$.

In similar manner, equation (4) becomes program equation (10) below:

$$\min_{u_p} f(u_p) := \|(X - \bar{U}_{p-1} V_{p-1}) - u_p v_p^T\|_\Omega^2 \qquad (10)$$

$$= \|(X - \bar{U}_{p-1} V_{p-1})^T - v_p u_p^T\|_\Omega^2$$

$$= \|R_p' - v_p u_p^T\|_\Omega^2$$

where $V_{p-1} = [v_1, v_2, \ldots, v_{p-1}]$ and $R_p' = (X - \bar{U}_{p-1} V_{p-1})^T$.

Problem equation (10) is the special case of equation (5) with single column and can be decomposed as the following m subproblems as presented by equation (11):

$$\min_{(u_p)_i} f((u_p)_i) := \|(R_p')_{:,i} - v_p (u_p)_i\|_\Omega^2 \qquad (11)$$

The equation (11) can be rewritten as equation (12) below:

$$\min_{(u_p)_i} f((u_p)_i) := \|((R_p')_{:,i})_{\mathcal{J}_i} - (v_p)_{\mathcal{J}_i} (u_p)_i\|^2 \qquad (12)$$

where $\mathcal{J}_i$ is the set of row indices of the observed values in the $i^{th}$ column of $R_p'$ for i=1, 2, . . . , m.

The LS solution of equation (12) is calculated by the equation (13) below:

$$(u_p)_i = (v_p^T)_{\mathcal{J}_i} ((R_p')_{:,i})_{\mathcal{J}_i} / ((v_p^T)_{\mathcal{J}_i} (v_p)_{\mathcal{J}_i}) \qquad (13)$$

and the corresponding computational complexity is $\mathcal{O}(|\Omega|)$.

The process steps of AROMC computation are summarized in Algorithm 1 below:

---

Algorithm 1 Adaptive Rank-One Matrix Completion (AROMC) using Sum of Outer Products

---

Input: Incomplete matrix $X_\Omega$, index set $\Omega$, maximum allowable outer
iteration number $I_m$, and tolerance parameter $\zeta$
  Initialize: $\bar{U}_0 = \emptyset$
  for p = 1, 2, . . . , $I_m$ do
    // In the pth outer iteration
    Randomly initialize $u_p$ and define $U_p^0 = [\bar{U}_{p-1}, u_p]$.
    for k = 1, 2, . . . do
      // In the kth inner iteration, ase alternating LS to find p outer
      products
      for j = 1, 2, . . . , n do
        // Fix $(U_p^{k-1})_{\mathcal{I}_j}$ optimize $V_p$ $$(V_p^k)_{j,:} \leftarrow \arg\min_{V_{j,:}} \|(X_{:,j})_{\mathcal{I}_j} - (U_p^{k-1})_{\mathcal{I}_j} V_{j,:}^T\|^2$$

Algorithm 1 Adaptive Rank-One Matrix Completion (AROMC) using Sum of Outer Products end for
    for i = 1, 2, . . . , m do
      // Fix $(V_p^k)_{J_i}$, optimize $u_p^k$ $$(u_p^k)_i \leftarrow \underset{(u_p)_i}{\operatorname{argmin}} \left\| \left( (R'_p)_{:,i} \right)_{\mathcal{J}_i} - (v_p^k)_{\mathcal{J}_i}(u_p)_i \right\|^2$$

end for
    Stop, if convergent.
  end for
  Set $\bar{u}_p = u_p^k$, $\overline{U}_p = [\overline{U}_{p-1}, \bar{u}_p]$, and calculate $M = \overline{U}_p V_p^k$.
  Stop, if a termination condition is satisfied.
end for
Output: M.

Note that there are two kinds of iterations: inner iteration and outer iteration. The inner iteration is mainly used to find the solutions to basis vectors and the associated weight vectors via alternating minimization.

Defining $$\varepsilon(U_p^k, V_p^k) = \|X - U_p^k(V_p^k)^T\|_\Omega^2 / \|X\|_\Omega^2$$

and $\delta = \varepsilon(U_p^k, V_p^k) - \varepsilon(U_p^{k+1}, V_p^{k+1})$. If $\delta \leq 10^{-5}$, the processor 110 determines that $u_p^k$ and $V_p^k$ obtained in this inner iteration satisfy the convergence condition and the inner iteration will stop; where $10^{-5}$ can be set to other value by the third parameter ($\delta_{TH}$), which is a convergence coefficient.

The outer iteration aims to increase the dimension of basis space; that is, increasing one basis vector at each outer iteration. Its stopping conditions are the maximum allowable number of outer iterations $I_m$ or based on the relative gap (RG) of the Frobenius norm of the two most recent adjacent rank-one matrices. RG can be expressed by equation (14) below:

$$RG = \frac{\|u_{p-1} v_{p-1}^T\|_F - \|u_p v_p^T\|_F}{\|u_{p-1} v_{p-1}^T\|_F} \quad (14)$$

When the outer iteration number reaches $I_m$, or RG≤ζ, the algorithm terminates; where $I_m$ can be set by the first parameter, and ζ can be set by the second parameter (ζ), which is a tolerance coefficient.

The reason of using RG as the termination condition is that for low-rank matrix such as images, which is contaminated by Gaussian noise, the gap of singular value above the "elbow" is bigger than that below the "elbow". Compared with the matrix constructed by the singular values above the elbow and the associated singular vectors, the matrix that is generated by the singular values below the elbow and associated singular vectors is noisier. In other words, elbow is the position where the relative gap of the singular value of an image becomes significantly smaller. Hence, the latter should not be involved in the estimated matrix. Thereby, the proposed algorithm attempts to find a sum of rank-one matrices with less noise by stopping the iterative procedure before the elbow. Since for the $p^{th}$ rank-one matrix, $\|u_p v_p^T\|_F$ is approximately equal to the $p^{th}$ singular value and hence the gap of singular values is calculated by RG.

Figure 4:
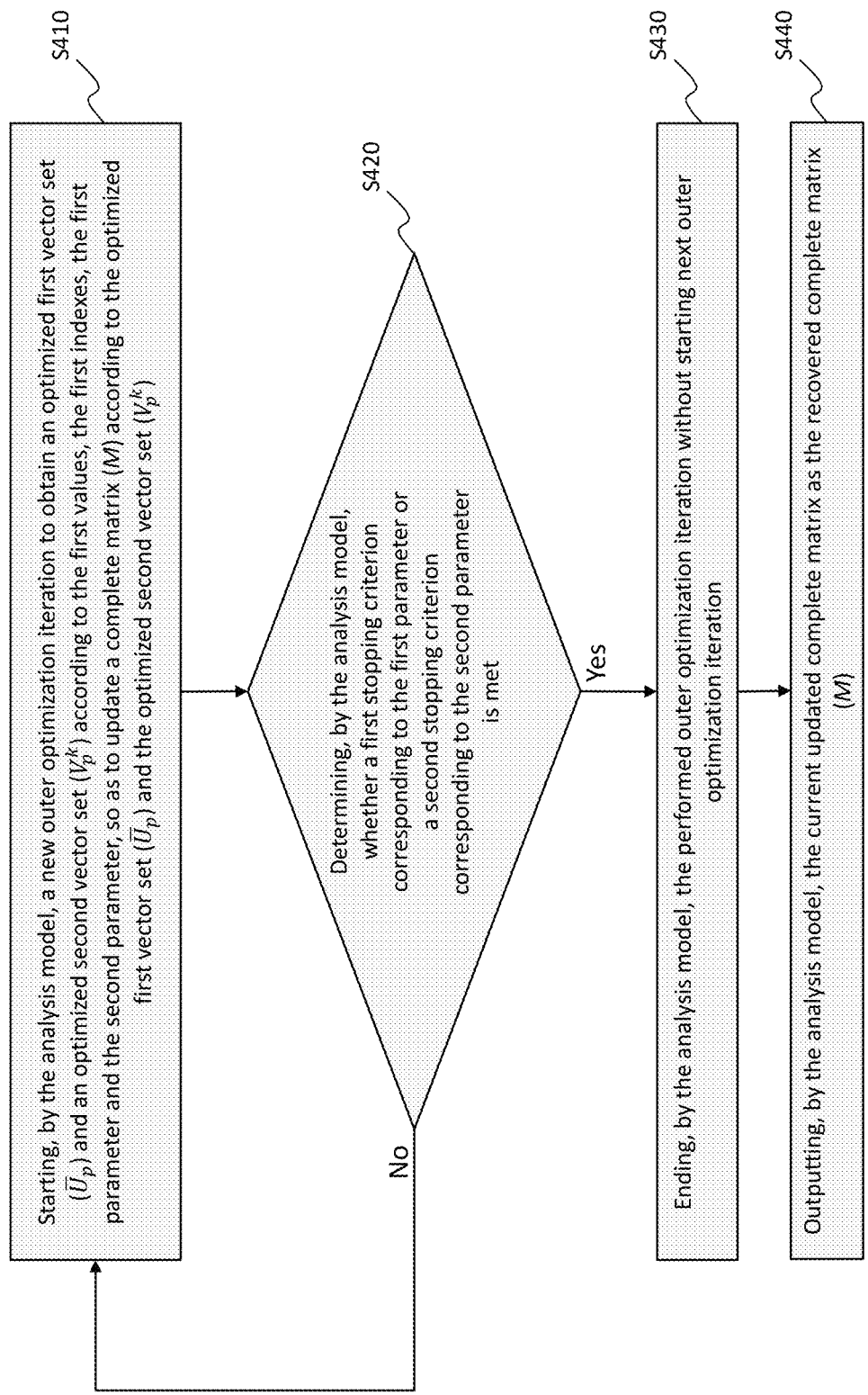
FIG. 4 depicts a flowchart of the AROMC algorithm implemented by the electronic device.

Referring to FIG. 4 in the following description. In step S410, the processor 110 (executing the analysis model 200) starts a new outer optimization iteration to obtain an optimized first vector set ($\overline{U}_p$) and an optimized second vector set ($V_p^k$) according to the first values, the first indexes, the first parameter, and the second parameter, so as to update a complete matrix (M) according to the optimized first vector set ($\overline{U}_p$) and the optimized second vector set ($V_p^k$).

Next, in step S420, the processor 110 determines whether a first stopping criterion corresponding to the first parameter ($I_m$) or a second stopping criterion corresponding to the second parameter (ζ) is met. When the total number of the performed outer optimization iterations reaches the first parameter, the processor 110 determines that the first stopping criterion is met. When a calculated RG of current outer optimization iteration is larger than the second parameter, the processor 110 determines that the second stopping criterion is met. The details of step S420 are set forth below with reference to FIG. 5.

If the first stopping criterion and the second stopping criterion are both not met, the processor 110 starts the next outer optimization iteration (i.e., continue to step S410). Otherwise, if the first stopping criterion or the second stopping criterion is met, continue to step S430; in this case, the processor 110 ends the performed outer optimization iteration without starting next outer optimization iteration. Next, in step S440, the processor 110 outputs the current updated complete matrix as the recovered complete matrix (M).

Figure 5:
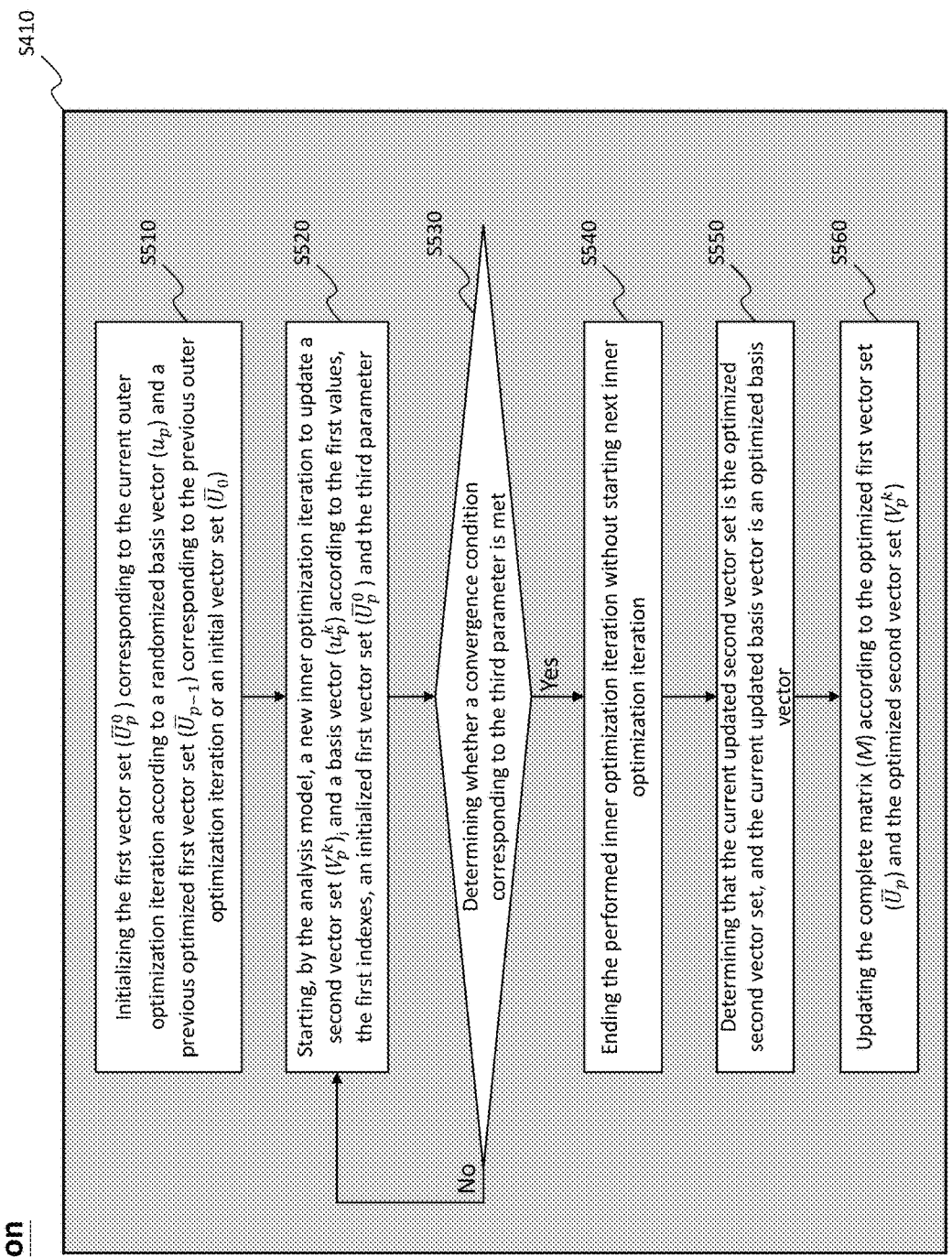
FIG. 5 depicts a flowchart of step S410 of FIG. 4.

Referring to FIG. 5 in the following description. In step S510, the processor 110 initializes the first vector set ($\overline{U}_p^0$) corresponding to the current outer optimization iteration according to a randomized basis vector ($u_p$) and a previous optimized first vector set ($\overline{U}_{p-1}$) corresponding to the previous outer optimization iteration or an initial vector set ($\overline{U}_0$).

Next, in step S520, the processor 110 starts a new inner optimization iteration to update a second vector set ($V_p^k$)$_j$ and a basis vector ($u_p^k$) according to the first values, the first indexes, an initialized first vector set ($\overline{U}_p^0$) and the third parameter. $V_p^k$ denotes a matrix containing p columns in the $p^{th}$ outer optimization iteration and $k^{th}$ inner optimization iteration; and $u_p^k$ denotes the $p^{th}$ basis vector obtained in the $k^{th}$ inner iteration.

Figure 6:
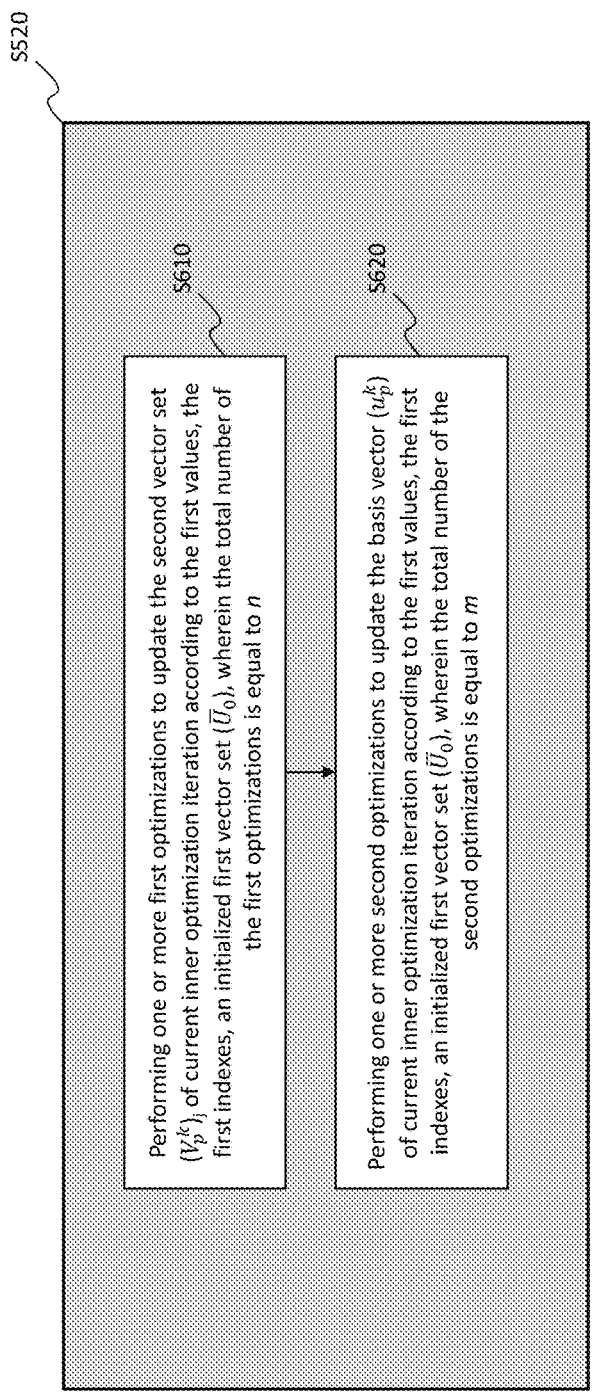
FIG. 6 depicts a flowchart of step S520 of FIG. 5.

Referring to FIG. 6 in the following description. In step S610, the processor 110 performs one or more first optimizations to update the second vector set ($V_p^k$)$_j$ of the current inner optimization iteration according to the first values, the first indexes, an initialized first vector set ($\overline{U}_0$), wherein the total number of the first optimizations is equal to n (i.e., the total number of the rows of the incomplete matrix). In more details, the first optimizations are performed according to equations (8) and (9). The second vector set ($V_p^k$)$_j$ is calculated by the solution equation (9). $(U_p^{k-1}) \mathcal{I}_j$ denotes a submatrix of U in the $p^{th}$ outer optimization iteration and the $(k-1)^{th}$ inner iteration, and the submatrix contains |$\mathcal{I}_j$| rows indexed by $\mathcal{I}_j$. In finding the optimal $V_{j,:}$, the residual error calculated by $\|(X_{:,j})_{\mathcal{I}_j} - U_{\mathcal{I}_j} V_{j,:}^T\|^2$ is minimized.

Next, in step S620, the processor 110 performs one or more second optimizations to update the basis vector ($u_p^k$) of current inner optimization iteration according to the first values, the first indexes, an initialized first vector set ($\overline{U}_0$), wherein the total number of the second optimizations is equal to m (i.e., the total number of the columns of the incomplete matrix). In more details, the second optimizations are performed according to equations (12) and (13). The basis vector ($u_p^k$) is calculated by the solution equation (13). $(V_p^k)_{\mathcal{J}_i}$ denotes a submatrix of V in the $p^{th}$ outer iteration and the $k^{th}$ inner iteration, and the submatrix contains $|\mathcal{J}_i|$ rows indexed by $\mathcal{J}_i$. In finding a better $(u_p)_i$, the residual error calculated by $$\left\| \left((R'_p)_{:,i}\right)_{\mathcal{J}_i} - (v_p)_{\mathcal{J}_i}(u_p)_i \right\|^2$$

is minimized.

Referring again to FIG. 5 in the following description. In step S530, the processor 110 determines whether a convergence condition corresponding to the third parameter ($\delta_{TH}$) is met. When the performance of an inner optimization iteration is completed, the processor 110 calculates a convergence difference ($\delta$) by $\delta = \varepsilon(U_p^k, V_p^k) - \varepsilon(U_p^{k+1}, V_p^{k+1})$ as mentioned above.

If the calculated convergence difference ($\delta$) corresponding to this inner optimization iteration is larger than the third parameter ($\delta_{TH}$), the processor 110 determines that $u_p^k$ and $V_p^k$ obtained in this inner iteration do not satisfy the convergence condition (the convergence condition is not met)

If the convergence difference ($\delta$) is not larger than the third parameter ($\delta_{TH}$), the processor 110 determines that $u_p^k$ and $V_p^k$ obtained in this inner iteration satisfy the convergence condition (the convergence condition is met).

That is, in step S540, the processor 110 ends the performance of an inner optimization iteration without starting the next inner optimization iteration (e.g., the processor 110 stops to perform next inner optimization iteration).

Next, in step S550, the processor 110 determines that the current updated second vector set is the optimized second vector set ($V_p^k$), and the current updated basis vector is an optimized basis vector ($u_p^k$).

Next, in step S560, the processor 110 updates the complete matrix (M) according to the optimized first vector set ($\overline{U}_p$) and the optimized second vector set ($V_p^k$). Namely, the complete matrix is updated by $M = \overline{U}_p V_p^k$.

Figure 7:
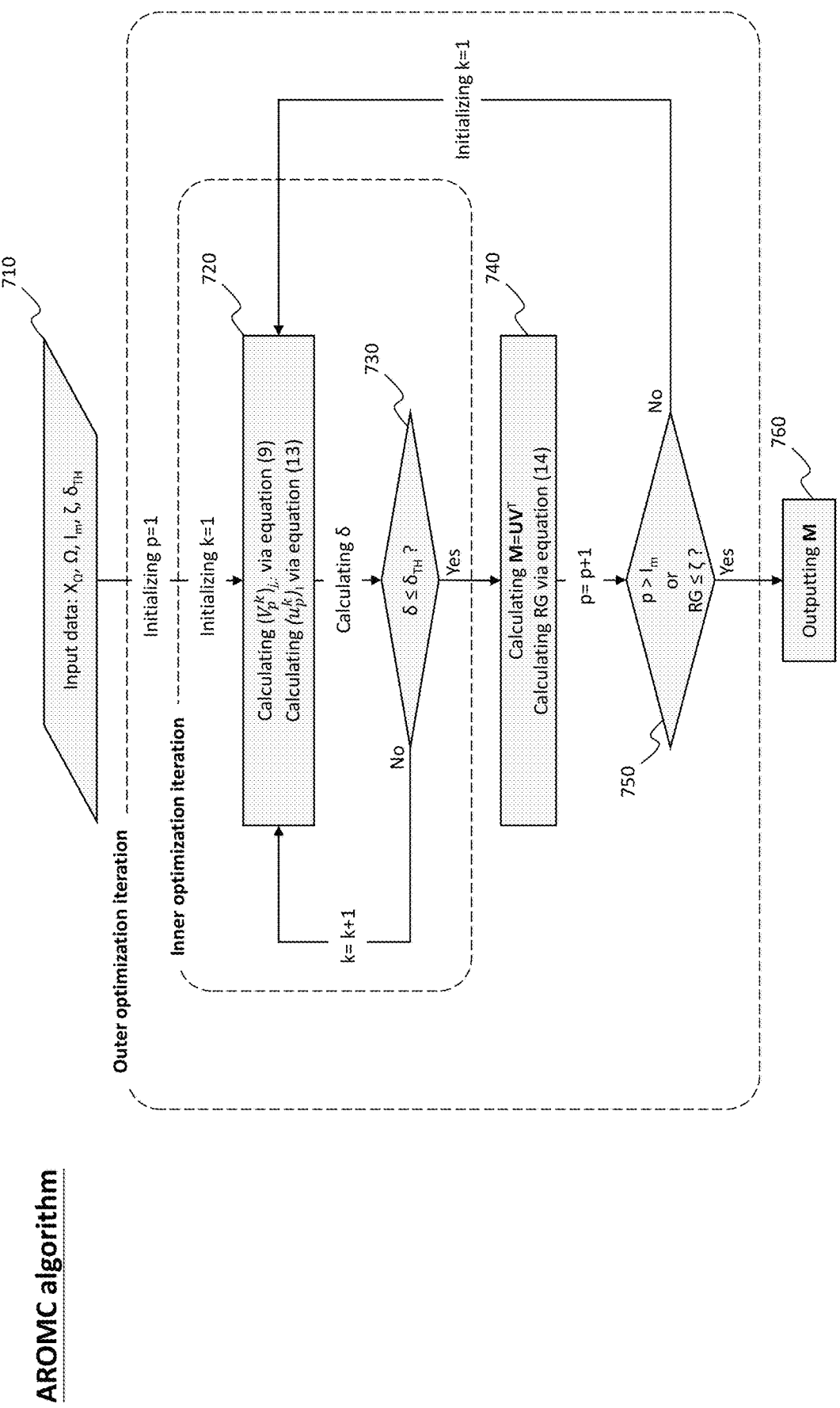
FIG. 7 depicts a further flowchart of the AROMC algorithm.

Referring to FIG. 7 in the following description. According to Algorithm 1, in block 710, the processor 110 in executing the analysis model 200 receives the input data, $X_\Omega$, $\Omega$, $I_m$, $\zeta$, and $\delta_{TH}$. Then, the processor 110 performs an outer optimization iteration, initializes p as 1, performs a new inner optimization iteration, initialize k as 1. Before performing the algorithm, the basis vectors are empty. That is, when p=1, $\overline{U}_1 = [\overline{U}_0, u_1] = u_1$.

Next, in block 720, the processor 110 in executing the analysis model 200 calculates the second vector set $(V_p^k)_{j,:}$ via equation (9), and calculates the basis vector $(u_p^k)_i$ via equation (13). Then, the processor 110 calculates the convergence difference ($\delta$) to determine whether the convergence difference ($\delta$) is not larger than the third parameter ($\delta_{TH}$) (i.e., block 730). If the convergence difference ($\delta$) is larger than the third parameter ($\delta_{TH}$), the analysis model 200 increases k by 1, and continues to block 720; If the convergence difference ($\delta$) is not larger than the third parameter ($\delta_{TH}$), in block 740, the processor 110 calculates complete matrix by $M = UV^T$, and calculates RG via equation (14). Then, the current outer optimization iteration is completed, and the processor 110 increases p by 1.

Next, in block 750, the processor 110 in executing the analysis model 200 determines whether the first stopping criterion (e.g., $p > I_m$) or the second stopping criterion (RG$\leq \zeta$) is met.

If the first stopping criterion or the second stopping criterion is met, in block 760, the processor 110 outputs the current updated/calculated complete matrix M as the recovered complete matrix. If the first stopping criterion and the second stopping criterion are both not met, the processor 110 initializes k as 1, and performs the next outer optimization iteration (p is increased by 1), the flow will continue to block 720 for a new inner optimization iteration of next outer optimization iteration.

The provided AROMC algorithm is different from conventional SVD, although they are both for finding V. First, when the matrix rank r is known, given V, all the r column vectors in U are to be determined by SVD. For AROMC algorithm, on the other hand, the first (r−1) column vectors are fixed and only the last column vector needs to be solved. Second, when r is unknown, SVD is not applicable, but AROMC can complete $X_\Omega$, because it can gradually increase the number of basis vectors until an optimal rank estimate is reached. The second point is extremely important because it is often difficult to determine the ranks of real-world data.

Furthermore, AROMC is also different from other conventional matrix completion algorithm, such as OR1MP, EOR1MP, and L1MC-RF, although they are all based on the idea of rank-one matrices for matrix completion. The difference between AROMC and OR1MP or EOR1MP is that firstly, the bases that they are searching for are different. Compared with OR1MP and EOR1MP that find rank-one basis matrices, AROMC aims to seek the basis vectors that are used to construct the adjustable rank-one basis matrices. However, the previously computed basis matrices in OR1MP and EOR1MP remain unchanged, so AROMC has a more flexible basis matrix subspace. Secondly, OR1MP and EOR1MP have a particular step to refine the weights of different rank-one basis matrices after completing the current iteration, while AROMC only involves weight vectors and they are solved during the iterative procedure. For L1MC-RF, it requires $l_1$-norm to estimate the matrix rank, and makes use of truncated SVD to achieve matrix completion. Nevertheless, AROMC can obtain an appropriate rank by gradually increasing its basis vectors and applies alternating minimization to find solutions.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for reconstructing a damaged image by— performing a data recovering operation implemented by an electronic device, comprising:
   receiving, by a processor of the electronic device, interrupted or damaged image object data selected from the group consisting of multiple-input multiple-output (MIMO) radar signals and images, images to be inpainted, and hyperspectral remote sensing images having missing data entries corresponding to missing pixel values, wherein first entries other than the missing entries are determined as observed entries, and the values ($X_\Omega$) and positions ($\Omega$) of the observed entries are confirmed by the processor and wherein the interrupted or damaged image object data comprises a covering pattern on the image forming an incomplete image matrix;
   identifying, by the processor, a plurality of first values and a plurality of first indexes of a plurality of the first entries of the incomplete matrix, and one or more second values and one or more second indexes of one or more second entries of the incomplete matrix according to the object data,
   wherein the first values of the first entries are determined as original values of the first entries, and the one or more second values of the second entries are determined as non-original values of the second entries;
   inputting, by the processor, the first values ($X_\Omega$), the first indexes ($\Omega$), the second indexes, a preset first parameter, a preset second parameter and a preset third parameter into an executed analysis model using Adaptive Rank-One Matrix Completion (AROMC) algorithm,
   wherein the first parameter ($I_m$) is a maximum total number of one or more outer optimization iterations performed by the analysis model, the second parameter ($\zeta$) is a tolerance coefficient, and the third parameter ($\delta_{TH}$) is a convergence coefficient; and
   obtaining, by the processor, a recovered complete matrix corresponding to the incomplete matrix from the analysis model, so as to obtain optimized one or more second values of the second entries, wherein the optimized one or more second values are determined as original values of the second entries, such that missing data corresponding to the second entries of the incomplete matrix is recovered by the recovered complete matrix; and
   reconstructing the damaged image from the recovered complete matrix to form a reconstructed image.

2. The method of claim 1, further comprising:
   starting, by the analysis model, a new outer optimization iteration to obtain an optimized first vector set ($\overline{U}_p$) and an optimized second vector set ($V_p^k$) according to the first values, the first indexes, the first parameter and the second parameter, so as to update a complete matrix (M) according to the optimized first vector set ($\overline{U}_p$) and the optimized second vector set ($V_p^k$);
   determining, by the analysis model, whether a first stopping criterion corresponding to the first parameter or a second stopping criterion corresponding to the second parameter is met;
   if the first stopping criterion and the second stopping criterion are both not met, starting, by the analysis model, next outer optimization iteration; and
   if the first stopping criterion or the second stopping criterion is met,
   ending, by the analysis model, the performed outer optimization iteration without starting next outer optimization iteration; and
   outputting, by the analysis model, the current updated complete matrix (M) as the recovered complete matrix (M).

3. The method of claim 2, wherein during the outer optimization iteration, the method further comprising:
   initializing the first vector set ($\overline{U}_p^0$) corresponding to the current outer optimization iteration according to a randomized basis vector ($u_p$) and a previous optimized first vector set ($\overline{U}_{p-1}$) corresponding to the previous outer optimization iteration or an initial vector set ($\overline{U}_0$);
   starting, by the analysis model, a new inner optimization iteration to update a second vector set ($V_p^k$)$_j$ and a basis vector ($u_p^k$) according to the first values, the first indexes, an initialized first vector set ($\overline{U}_p^0$) and the third parameter;
   determining whether a convergence condition corresponding to the third parameter is met;
   if the convergence condition is not met, starting next inner optimization iteration; and
   if the convergence condition is met,
   ending the performed inner optimization iteration without starting next inner optimization iteration;
   determining that the current updated second vector set is the optimized second vector set, and the current updated basis vector is an optimized basis vector; and
   updating the complete matrix (M) according to the optimized first vector set ($\overline{U}_p$) and the optimized second vector set ($V_p^k$),
   wherein the optimized basis vector is used for generating the optimized first vector set ($\overline{U}_p=[\overline{U}_{p-1},u_p^k]$) by the previous optimized first vector set corresponding to the previous outer optimization iteration or the initial vector set.

4. The method of claim 3, wherein the dimensions of the incomplete matrix and the recovered complete matrix are m×n, and during each inner optimization iteration, the method further comprising:
   performing one or more first optimizations to update the second vector set ($V_p^k$)$_j$ of current inner optimization iteration according to the first values, the first indexes, an initialized first vector set ($\overline{U}_0$), wherein the total number of the first optimizations is equal to n; and performing one or more second optimizations to update the basis vector ($u_p^k$) of current inner optimization iteration according to the first values, the first indexes, an initialized first vector set ($\overline{U}_0$), wherein the total number of the second optimizations is equal to m.

5. The method of claim 4, wherein the first optimizations are performed according to the equation of the AROMC algorithm below:

$$\min_{V_{j,:}} f(V_{j,:}) := \left\| (X_{:,j})_{\mathcal{I}_j} - U_{\mathcal{I}_j} V_{j,:}^T \right\|^2$$

where $V_{j,:}$ represents the $j^{th}$ row of the second vector set V; $X_{:,j}$ denotes the $j^{th}$ row of the original input matrix; $U\mathcal{I}_j$ denotes the current updated first vector set, wherein $X_{:,j}$ and $U\mathcal{I}_j$ are fixed during the first optimizations.

6. The method of claim 4, wherein the second optimizations are performed according to the equation of the AROMC algorithm below:

$$\min_{(u_p)_i} f((u_p)_i) := \left\| \left( (R'_p)_{:,i} \right)_{\mathcal{J}_i} - (v_p)_{\mathcal{J}_i} (u_p)_i \right\|^2$$

wherein $(u_p)_i$ denotes the $i^{th}$ element of $u_p$; $(R_p')_{:,i}$ denotes the $i^{th}$ column of $R'_p$, $v_p$ denotes the $p^{th}$ column in V.

7. The method of claim 3, wherein the complete matrix (M) is calculated by the equation of the AROMC algorithm below:

$$M = \overline{U}_p V_p^k$$

wherein $\overline{U}_p$ denotes the optimized first vector set; and $V_p^k$ denotes the optimized second vector set.

8. An electronic device for performing data recovering operation by inpainting a damaged image, comprising: a processor, configured to execute machine instructions to implement a computer-implemented method, the method comprising:

receiving, by a processor of the electronic device, interrupted or damaged image object data selected from the group consisting of multiple-input multiple-output (MIMO) radar signals and images, images to be inpainted, and hyperspectral remote sensing images having missing data entries corresponding to missing pixel values, wherein first entries other than the missing entries are determined as observed entries, and the values ($X_\Omega$) and positions ($\Omega$) of the observed entries are confirmed by the processor and wherein the interrupted or damaged image object data comprises a covering pattern on the image forming an incomplete image matrix;

identifying, by the processor, a plurality of first values and a plurality of first indexes of a plurality of the first entries of the incomplete matrix, and one or more second values and one or more second indexes of one or more second entries of the incomplete matrix according to the object data, wherein the first values of the first entries are determined as original values of the first entries, and the one or more second values of the second entries are determined as non-original values of the second entries;

inputting, by the processor, the first values ($X_\Omega$), the first indexes ($\Omega$), the second indexes, a preset first parameter, a preset second parameter and a preset third parameter into an executed analysis model using Adaptive Rank-One Matrix Completion (AROMC) algorithm, wherein the first parameter ($I_m$) is a maximum total number of one or more outer optimization iterations performed by the analysis model, the second parameter ($\zeta$) is a tolerance coefficient, and the third parameter ($\delta_{TH}$) is a convergence coefficient; and obtaining, by the processor, a recovered complete matrix corresponding to the incomplete matrix from the analysis model, so as to obtain optimized one or more second values of the second entries, wherein the optimized one or more second values are determined as original values of the second entries, such that missing data corresponding to the second entries of the incomplete matrix is recovered by the recovered complete matrix; and reconstructing the damaged image from the recovered complete matrix to form a reconstructed image.

9. The electronic device of claim 8, the method further comprising:

starting, by the analysis model, a new outer optimization iteration to obtain an optimized first vector set ($\overline{U}_p$) and an optimized second vector set ($V_p^k$) according to the first values, the first indexes, the first parameter and the second parameter, so as to update a complete matrix (M) according to the optimized first vector set ($\overline{U}_p$) and the optimized second vector set ($V_p^k$);

determining, by the analysis model, whether a first stopping criterion corresponding to the first parameter or a second stopping criterion corresponding to the second parameter is met;

if the first stopping criterion and the second stopping criterion are both not met, starting, by the analysis model, next outer optimization iteration; and if the first stopping criterion or the second stopping criterion is met, ending, by the analysis model, the performed outer optimization iteration without starting next outer optimization iteration; and outputting, by the analysis model, the current updated complete matrix (M) as the recovered complete matrix (M).

10. The electronic device of claim 9, wherein during each outer optimization iteration, the method further comprising:

initializing the first vector set ($\overline{U}_p^0$) corresponding to the current outer optimization iteration according to a randomized basis vector ($u_p$) and a previous optimized first vector set ($\overline{U}_{p-1}$) corresponding to the previous outer optimization iteration or an initial vector set ($\overline{U}_0$);

starting, by the analysis model, a new inner optimization iteration to update a second vector set ($V_p^k)_j$ and a basis vector ($u_p^k$) according to the first values, the first indexes, an initialized first vector set ($\overline{U}_p^0$) and the third parameter;

determining whether a convergence condition corresponding to the third parameter is met;

if the convergence condition is not met, starting next inner optimization iteration; and if the convergence condition is met, ending the performed inner optimization iteration without starting next inner optimization iteration;

determining that the current updated second vector set is the optimized second vector set, and the current updated basis vector is an optimized basis vector; and updating the complete matrix (M) according to the optimized first vector set ($\overline{U}_p$) and the optimized second vector set ($V_p^k$), wherein the optimized basis vector is used for generating the optimized first vector set ($\overline{U}_p=[\overline{U}_{p-1}, u_p^k]$) by the previous optimized first vector set corresponding to the previous outer optimization iteration or the initial vector set.

11. The electronic device of claim 10, wherein the dimensions of the incomplete matrix and the recovered complete matrix are m×n, and during each inner optimization iteration, the method further comprising:

performing one or more first optimizations to update the second vector set $(V_p^k)_j$ of current inner optimization iteration according to the first values, the first indexes, an initialized first vector set ($\overline{U}_0$), wherein the total number of the first optimizations is equal to n; and performing one or more second optimizations to update the basis vector ($u_p^k$) of current inner optimization iteration according to the first values, the first indexes, an initialized first vector set ($\overline{U}_0$), wherein the total number of the second optimizations is equal to m.

12. The electronic device of claim 11, wherein the first optimizations are performed according to the equation of the AROMC algorithm below:

$$\min_{V_{j,:}} f(V_{j,:}) := \left\| (X_{:,j})_{\mathcal{I}_j} - U_{\mathcal{I}_j} V_{j,:}^T \right\|^2$$

where $V_{j,:}$ represents the $j^{th}$ row of the second vector set V; $X_{:,j}$ the $j^{th}$ row of the original input matrix; $U_{\mathcal{I}_j}$ denotes the current updated first vector set, wherein $X_{:,j}$ and $U_{\mathcal{I}_j}$ are fixed during the first optimizations.

13. The electronic device of claim 11, wherein the second optimizations are performed according to the equation of the AROMC algorithm below:

$$\min_{(u_p)_i} f((u_p)_i) := \left\| \left( (R'_p)_{:,i} \right)_{\mathcal{J}_i} - (v_p)_{\mathcal{J}_i} (u_p)_i \right\|^2$$

wherein $(u_p)_i$ denotes the $i^{th}$ element of $u_p$; $(R'_p)_{:,i}$ denotes the $i^{th}$ column of $R'_p$; $v_p$ denotes the $p^{th}$ column in V.

14. The electronic device of claim 10, wherein the complete matrix (M) is calculated by the equation of the AROMC algorithm below:

$$M = \overline{U}_p V_p^k$$

wherein $\overline{U}_p$ denotes the optimized first vector set; and $V_p^k$ denotes the optimized second vector set.

* * * * *